(No Model.)

W. BRUCE.
GATE.

No. 292,405. Patented Jan. 22, 1884.

WITNESSES

W. Bruce
INVENTOR by C. A. Snow & Co.
Attorneys

UNITED STATES PATENT OFFICE.

WALLACE BRUCE, OF ELK GROVE, CALIFORNIA.

GATE.

SPECIFICATION forming part of Letters Patent No. 292,405, dated January 22, 1884.

Application filed July 19, 1883. (No model.)

*To all whom it may concern:*

Be it known that I, WALLACE BRUCE, a citizen of the United States, residing at Elk Grove, in the county of Sacramento and State of California, have invented a new and useful Gate, of which the following is a specification, reference being had to the accompanying drawings.

This invention relates to gates of that class which are adapted to be opened by operating a pull-cord at either side; and its object is to provide a device for operating the gate which can be easily applied to swinging gates now in use, and which will possess superior advantages in point of simplicity, inexpensiveness, durability, and general efficiency.

Figure 1:
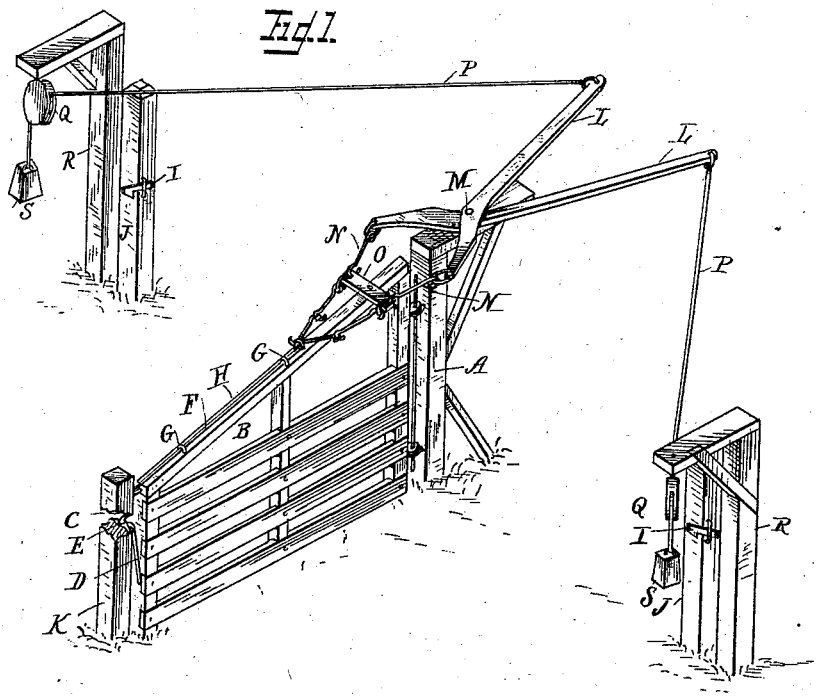
Figure 2:
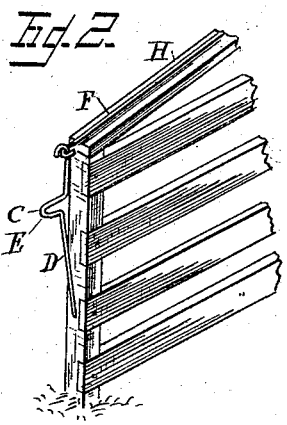

In the drawings, Figure 1 is a perspective view of my improved gate. Fig. 2 is a detail view of the spring-latch.

Referring to the drawings, A designates the gate-post, to which the gate B is hinged in any suitable manner, to enable it to swing in either direction. The free end of the gate is provided with a spring-latch, C, preferably formed of elastic wire, secured at its lower end to the gate, from which it projects outwardly and upwardly, as shown at D, and is bent outwardly and inwardly, to form a latch-tongue, E, above which it is connected with an operating-rod, F, which slides in staples G G, arranged on the inclined top beam, H, of the gate. The latch is adapted to automatically engage pivoted catches I I, arranged on end posts, J J, and on a latch-post, K, to lock the gate in closed position.

L L are two cross-levers, which are fulcrumed by a pin, M, on top of the main post A. The short ends of these cross-levers are connected by chains N with the ends of an evener, O, that is pivoted on the top beam, H, of the gate. From the long ends of the cross-levers extend pull-cords P, that pass over pulleys Q, pendent from posts R, and are provided with weighted ends S, to assist in opening the gate. When either one of these pull-cords is operated, the cross-lever to which it is connected will draw on the evener, so that the gate will be swung on its hinges. As the evener swings on its pivot it will draw on the rod F, which will draw the spring latch-rod in against the end post of the gate and from engagement with the catches.

It will be observed that when one weighted cord is drawn down to open the gate, the weighted end of the other cord will be elevated by reason of the movement of its lever. This relative action of the two levers is caused by the evener O, which, when it is drawn upon at one end by one of the levers, draws upon the other lever at its other end, so that the ends of the levers follow each other and effect the action of the weights, by which the opening and closing of the gate is materially assisted. The evener, in connection with the double cross-levers having the common pivot, thus secures an even, smooth, and uniform action of all the parts of the gate when operated from either side.

The operation and advantages of my invention will be readily understood and appreciated. It is simple and inexpensive in construction, and will operate with superior efficiency and convenience.

I claim as my invention—

1. The combination of the hinge-post, a gate hinged thereto so as to swing in either direction, an evener pivoted on top of the gate, the cross-levers pivoted on the top of the hinge-post by the single pivot-pin, pull-cords connected to the operating ends of the cross-levers, and chains extending from the other ends of the levers to the ends of the evener, substantially as and for the purpose set forth.

2. The combination of the hinge-post, the gate hinged thereto so as to swing in either direction, the spring-latch secured to the free end of the gate, the evener centrally pivoted on top the gate, a sliding rod connected with the end of the latch, chains connecting the other end of this rod with the ends of the evener, the cross-levers fulcrumed on top of the hinge-post and connected each with one end of the evener, and means for operating the levers, substantially as and for the purpose set forth.

3. The combination of the hinge-post, the latch-posts arranged at the sides and in front of the latter, the gate hinged to the hinge-post, the spring latch-rod secured on the free end of the gate, the evener centrally pivoted on top of the gate, the sliding rod connected to the free end of the latch-rod, chains connecting the operating-rod with the ends of the evener, the cross-levers pivoted on top of the hinge-post by the single pivot-pin, the chains connecting the end of these levers with the ends of the evener, and the weighted pull-cords extending from the long ends of the cross-levers, substantially as and for the purpose set forth.

In testimony that I claim the foregoing as my own I have hereto affixed my signature in presence of two witnesses.

WALLACE BRUCE.

Witnesses:
GEO. H. KERR,
MARY KERR.